US010696115B2

(12) United States Patent
Bartlett et al.

(10) Patent No.: US 10,696,115 B2
(45) Date of Patent: Jun. 30, 2020

(54) MOVEMENT SYSTEM FOR AN OMNIDIRECTIONAL VEHICLE (71) Applicant: Southwest Research Institute, San Antonio, TX (US)

(72) Inventors: Glynn R. Bartlett, Boerne, TX (US); Cody E. Bressler, San Antonio, TX (US); Cody M. Porter, Helotes, TX (US); Michael A. Ripperger, San Antonio, TX (US)

(*) Notice: Subject to any disclaimer, the term of this patent is extended or adjusted under 35 U.S.C. 154(b) by 19 days.

(21) Appl. No.: 16/015,243

(22) Filed: Jun. 22, 2018

(65) Prior Publication Data
US 2019/0389265 A1 Dec. 26, 2019

(51) Int. Cl.
*B60G 11/27* (2006.01)
*B60B 19/12* (2006.01)
*B60K 7/00* (2006.01)
*B60B 19/00* (2006.01)

(52) U.S. Cl.
CPC ............ *B60G 11/27* (2013.01); *B60B 19/003* (2013.01); *B60K 7/0007* (2013.01); *B60B 19/12* (2013.01); *B60G 2202/152* (2013.01)

(58) Field of Classification Search
CPC . B60G 11/27; B60G 2202/152; B60B 19/003; B60B 19/12; B60B 19/00; B60K 7/0007; B60K 7/00; Y10S 901/01; B65G 2207/34; G05B 2219/40298; G05B 2219/45071
USPC ................................ 180/20; 301/5.23; 901/1
See application file for complete search history.

(56) References Cited

U.S. PATENT DOCUMENTS

| 3,255,893 | A | 6/1966 | Hainer et al. | |
|---|---|---|---|---|
| 3,359,687 | A | 12/1967 | Wallace | |
| 3,876,255 | A | 4/1975 | Ilon | |
| 4,060,315 | A | 11/1977 | Heinz | |
| 4,659,902 | A | 4/1987 | Swensrud et al. | |
| 5,387,969 | A | 2/1995 | Marantette | |
| 8,496,299 | B2* | 7/2013 | Brudniok .............. | B60B 19/003 16/45 |
| 2008/0087484 | A1* | 4/2008 | Fenelli .................. | B60B 19/003 180/236 |
| 2008/0185222 | A1* | 8/2008 | Herrmann ............. | B66F 11/042 182/69.4 |
| 2009/0065113 | A1* | 3/2009 | Gunther ................ | B60B 19/003 152/1 |
| 2010/0143089 | A1* | 6/2010 | Hvass ................... | G05D 1/027 414/754 |
| 2010/0187779 | A1 | 7/2010 | Potter | |

(Continued)

FOREIGN PATENT DOCUMENTS

CN 104908547 A * 9/2015
CN 105479433 A * 4/2016

(Continued)

*Primary Examiner* — Keith J Frisby
(74) *Attorney, Agent, or Firm* — N.V. Nederlandsch Octrooibureau; Catherine A. Shultz; Katelyn J. Bernier (57) ABSTRACT An omnidirectional movement system includes a frame with a central axis extending from a first end to a second end; a support extending from the first end to the second end; a first set of Mecanum wheels connected through a first axle and connected to the frame; a second set of Mecanum wheels connected through a second axle and connected to the frame; and a flexible suspension system connecting the frame to the support.

17 Claims, 4 Drawing Sheets

(56) References Cited

U.S. PATENT DOCUMENTS

| | | | | |
|---|---|---|---|---|
| 2013/0226340 A1* | 8/2013 | Buchstab | .................... | B25J 5/04 |
| | | | | 700/245 |
| 2013/0292918 A1* | 11/2013 | Schlee | .................... | B60B 19/12 |
| | | | | 280/79.11 |
| 2013/0310982 A1* | 11/2013 | Scheurer | ................ | B25J 9/1664 |
| | | | | 700/263 |
| 2015/0050111 A1* | 2/2015 | Townsend | ................ | B25J 5/007 |
| | | | | 414/738 |
| 2015/0225082 A1* | 8/2015 | Levron | .................... | B64D 9/00 |
| | | | | 244/137.1 |
| 2017/0120443 A1* | 5/2017 | Kang | ....................... | B25J 5/007 |
| 2017/0325763 A1* | 11/2017 | Hoernig | ................. | A61B 5/055 |
| 2018/0326576 A1* | 11/2018 | Riedel | ...................... | B25J 5/007 |
| 2019/0099141 A1* | 4/2019 | Garlow | ................ | A61B 6/4405 |

FOREIGN PATENT DOCUMENTS

| | | | | | |
|---|---|---|---|---|---|
| CN | 106185730 | A | * | 12/2016 | |
| CN | 107758567 | A | | 3/2018 | |
| CN | 108247598 | A | | 7/2018 | |
| CN | 207632434 | U | | 7/2018 | |
| DE | 102006037108 | A1 | * | 2/2008 | .......... B60B 19/003 |
| EP | 0224451 | B1 | | 6/1989 | |
| EP | 2631041 | A2 | | 8/2013 | |
| KR | 101133996 | B1 | * | 4/2012 | |
| KR | 101307990 | B1 | * | 9/2013 | |
| WO | 2016068174 | A1 | | 5/2016 | |
| WO | WO-2017164926 | A1 | * | 9/2017 | ............. B62D 61/00 |

* cited by examiner

MOVEMENT SYSTEM FOR AN OMNIDIRECTIONAL VEHICLE

BACKGROUND

Bases for robotic systems are typically designed to have a large platform which is supported by a number of wheels or tracks working together for movement. The wheels or tracks typically have some ability to change directions, however in large robotic systems, the weight typically requires a substantial number of wheels to properly support the system, making it less able to move or change directions quickly.

SUMMARY

According to a first aspect of the invention, an omnidirectional movement system comprises a frame with a central axis extending from a first end to a second end; a support extending from the first end to the second end; a first set of Mecanum wheels connected through a first axle and connected to the frame; a second set of Mecanum wheels connected through a second axle and connected to the frame; and a flexible suspension system connecting the frame to the support.

Such a system can stably support a robotic system or other system for movement and for operations. The Mecanum wheels allow for movement in any direction, and the flexible suspension system can ensure smooth movement over uneven terrain, and the ability easily transition between movement and park modes of operation. The flexible suspension system can also ensure even support when in park mode. According to an embodiment, the system further comprises a first control arm connected to the frame along the central axis and connectable to a robotic system. This provides a simple system for transferring movement of the movement system to the device or system supported by the movement system.

According to an embodiment, the first control arm connects to the frame to control fore/aft stiffness between the frame and the support, and the system further comprises a second control arm connected to the frame in a direction perpendicular to the central axis and connectable to the robotic system to control position and stiffness for movement perpendicular to the central axis; and a third control arm connected to the frame in a direction perpendicular to the central axis and spaced from the second control arm, the third control arm connectable to the robotic system to control position and stiffness perpendicular to the central axis. The use of three control arms provides a steady and stable connection between the system and the device or system it is supporting. Optionally, the first control arm is connected to the frame such that it allows at least some rotation around the central axis, but is rigid in the direction of the central axis. The rotation allows for some flexibility in connections.

According to an embodiment, the flexible suspension system comprises a pneumatic system allowing for movement in the roll and pitch axes, and for vertical movement between the frame and the support. Optionally, the pneumatic system comprises at least one airbag. Further optionally, the pneumatic system comprises a first airbag on a first side of the central axis connecting between the frame and the support; and a second airbag on a second side of the central axis connecting between the frame and the support. Using one or more airbags can provide for flexible support, and the use of more than one airbag can be used to compensate for movement or parking on rough or uneven terrain.

According to an embodiment, the system further comprises a first motor with a drive system to drive at least one of the first and second sets of Mecanum wheels. Optionally, the system further comprises a second motor with drive system, wherein the first motor drives the first set of Mecanum wheels and the second motor drives the second set of Mecanum wheels. This can enable stable support and movement of large or heavy systems. In some systems, there may not be a motor, as the system may simply stay in the same location for all operations.

According to an embodiment, each Mecanum wheel comprises a central hub rotatable about an axis in line with the axle; an outer plate connected to the hub on a first side; an inner plate connected to the hub on a second side; and a plurality of rollers on the periphery of the hub connected between the outer plate and the inner plate.

According to an embodiment, each roller comprises a central shaft; a spindle surrounding the shaft and able to rotate with respect to the shaft; overmold material connected to an outside of the spindle; and tapered roller bearings connecting the spindle to the central shaft. Optionally, the overmold material is of constant thickness in every position on the spindle. Such wheels and rollers can result in long-life span rollers and wheels that are able to provide smooth motion over rough surfaces and reduce compressive stresses on the roller material. Having constant thickness for overmold can ensure constant deflection over the length of the roller and yield smooth load transitions from one roller to the next, thereby decreasing wear in certain areas.

According to an embodiment, the system further comprises a stabilizing system for stabilizing the movement system when in park mode. Optionally, the stabilizing system comprises a jack which is moveable in relation to the Mecanum wheels through the flexible suspension system. The jack can be lowered and/or the wheels raised and the jack would then support most or all of the moveable system instead of the wheels. This can provide a steady base to ensure no movement during surface treatment operations.

According to an embodiment, the frame comprises a first portion through which the first set of Mecanum wheels extend and connect to a second portion through which the second set of Mecanum wheels extend and connect to, and a central portion between the first portion and the second portion. Optionally, the central portion is rotatingly connected to the first portion and the second portion, and the flexible suspension system connects the central portion of the frame to the support. This rotatable connection can be through rotatable bearings or other means, and provides the various portions flexibility for stable support during movement no matter the terrain.

According to a further aspect, a robotic movement system comprises a robotic base; and at least one omnidirectional bogie systems, wherein each omnidirectional bogie systems comprises a frame; a first set of Mecanum wheels connected to the frame; a second set of Mecanum wheels connected to the frame; a flexible suspension system connecting the frame to the robotic base; wherein the flexible suspension system allows the bogie system to gimbal about a central axis with respect to the robotic base. Such a system can stably support the robotic base (and any robot) during movement and when parked. The use of a flexible suspension system allows for stable and steady support despite the terrain on which the system is travelling.

According to an embodiment, the flexible suspension system comprises at least one airbag connecting between the frame and the robotic base; and at least one control arm to control front/aft, moment and/or side stiffness for the bogie system with respect to the robotic base. The airbag can allow for easy cushioning during movements as well as transitioning between drive and park modes.

According to an embodiment, the robotic base is connected to a plurality of omnidirectional bogie systems. Using a plurality of bogie systems can allow for support and movement of very large robotic systems.

According to an embodiment, the system further comprises one or more jacks connected to the robotic base and moveable with respect to the Mecanum wheels through the suspension system from a drive mode where the one or more jacks are located above a ground surface with the Mecanum wheels supporting the robotic base on the ground surface to a park mode where the one or more jacks are supporting the robotic base on the ground surface. The relative movements can be facilitated by flexible suspension system(s) and/or other systems.

BRIEF DESCRIPTION OF THE DRAWINGS

FIG. 2b shows a side view of the system of FIG. 2a.

FIG. 2c shows an exploded view of the system of FIG. 2a.

FIG. 3a shows a perspective view of a wheel of the system of FIG. 2a.

FIG. 3c shows a cross-sectional view of a roller of the wheel of FIG. 3a.

DETAILED DESCRIPTION

Figure 1:
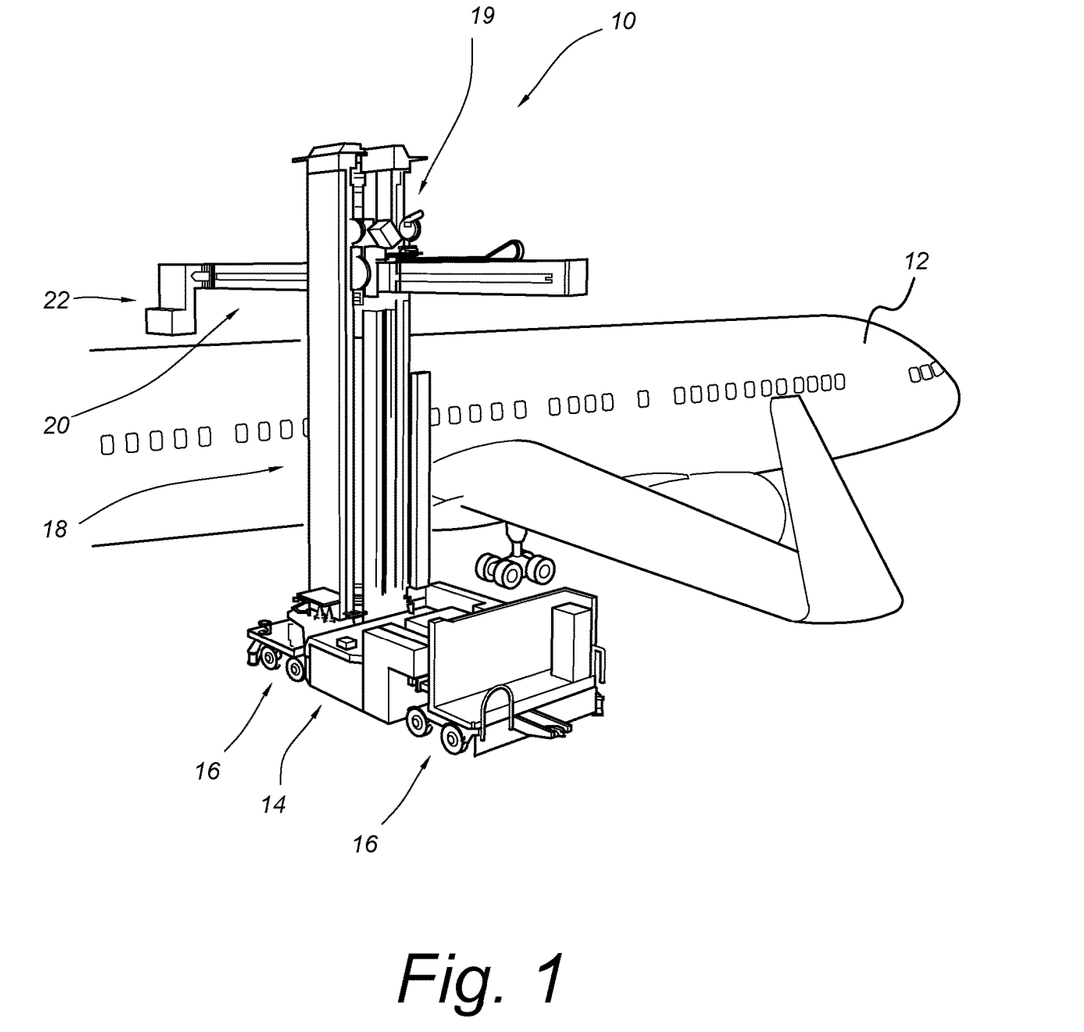
FIG. 1 illustrates a perspective view of a robotic system used for surface treatment of large vehicles.

FIG. 1 illustrates a perspective view of a robotic system 10 used for surface treatment of large vehicles. While system 10 is shown and described as a paint removal system using a high-power laser to ablate coatings by scanning a laser across a surface of aircraft 12, it should be understood that system 10 could be used to provide many different surface treatments, such as painting, sanding, direct printing, applying or removing other coatings or surface treatments, washing, wipe-down, surface scanning or inspection and repairs. Additionally, system 10 could be used with other vehicles or structures, such as helicopters, ships, trucks, cars, underwater vehicles, space craft; or any vehicles or structures that involve large areas and/or complicated positioning to reach all surfaces.

System 10 is a self-contained surface treatment system with mobile base 14 of omnidirectional movement systems (bogies) 16. Any needed utilities, such as electrical power, cooling water and gas may be provided via a tether, though in some cases, only some utilities or even none of these would be needed (e.g., power is provided by batteries), making system 10 flexible for operations at a variety of locations. Mobile base 14 is able to accommodate various aircraft and hangar variations by being relatively compact yet stable such that it can drive up to aircraft 12, "park" itself and provide a stable base for operations. Bogies 16 and a flexible suspension system result in mobile base 14 being able to evenly distribute the large load of system 10 while also being able to smoothly navigate areas that are not level or have obstacles. System 10 also includes a number of other components on base 14 related to the particular surface treatment, for example, a laser generator, exhaust filters, batteries, etc.

Surface treatments are delivered from base 14 through mast 18, shoulder 19, arm 20 and wrist 22, which in this case together provide the structure to enable the laser beam to transport from base 14 to any desired point on the aircraft 12 surface. Mast 18 and arm 20 are extendable and are able to rotate, though the rotation of mast 18 may be through base 14 movement or rotation. Shoulder 19 allows for the rotation and translation of arm 20 with respect to mast 18. Arm 20 is also able to move up and down through the length of mast 18. Wrist provides more axes of flexibility, for example 3, to provide system 10 the ability to reach and treat all surfaces of aircraft 12.

The laser is transported from base 14 to wrist 22 through hollow portions of mast 18, shoulder 19, arm 20 and wrist 22 and is guided by a series of mirrors with a mirror control system to ensure accurate laser beam positioning. System 10 can also include an exhaust gas system for removing the effluent through the interior of mast 18, shoulder 19, arm 20 and wrist 22; and a system for positioning and orientation of all system 10 components with respect to aircraft 12.

Figure 2A:
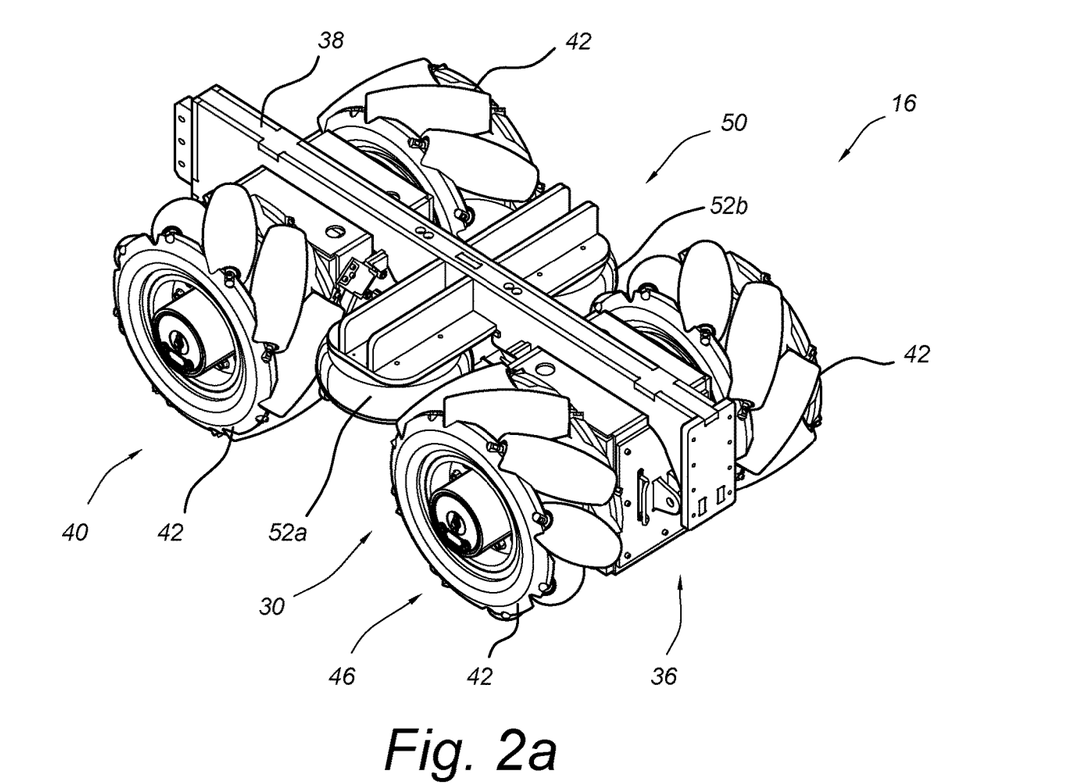
FIG. 2a shows a perspective view of an omnidirectional movement system.
Figure 2B:
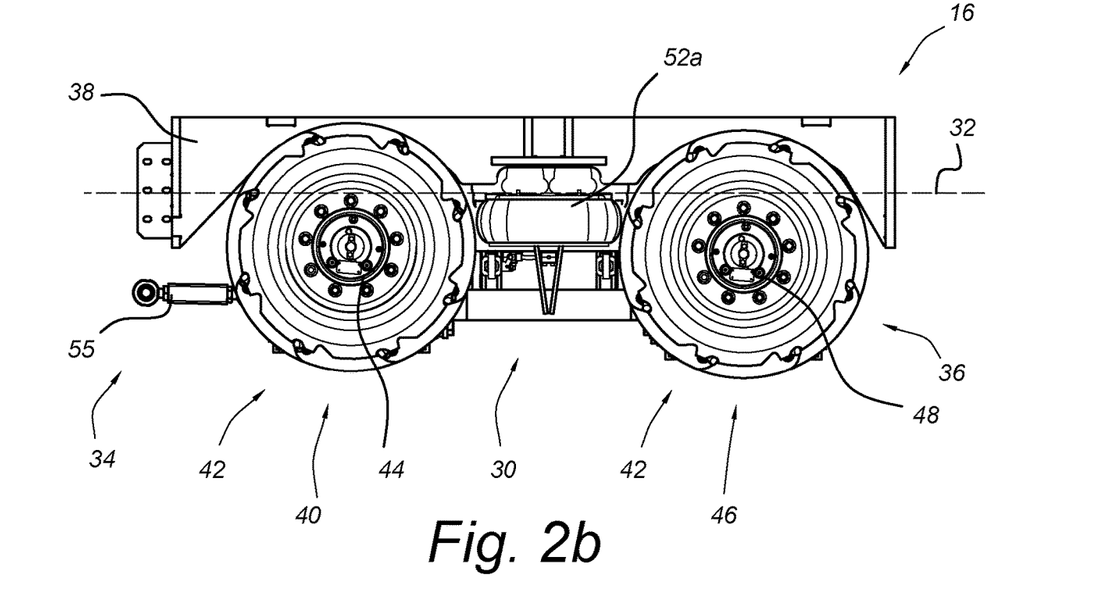
Figure 2C:
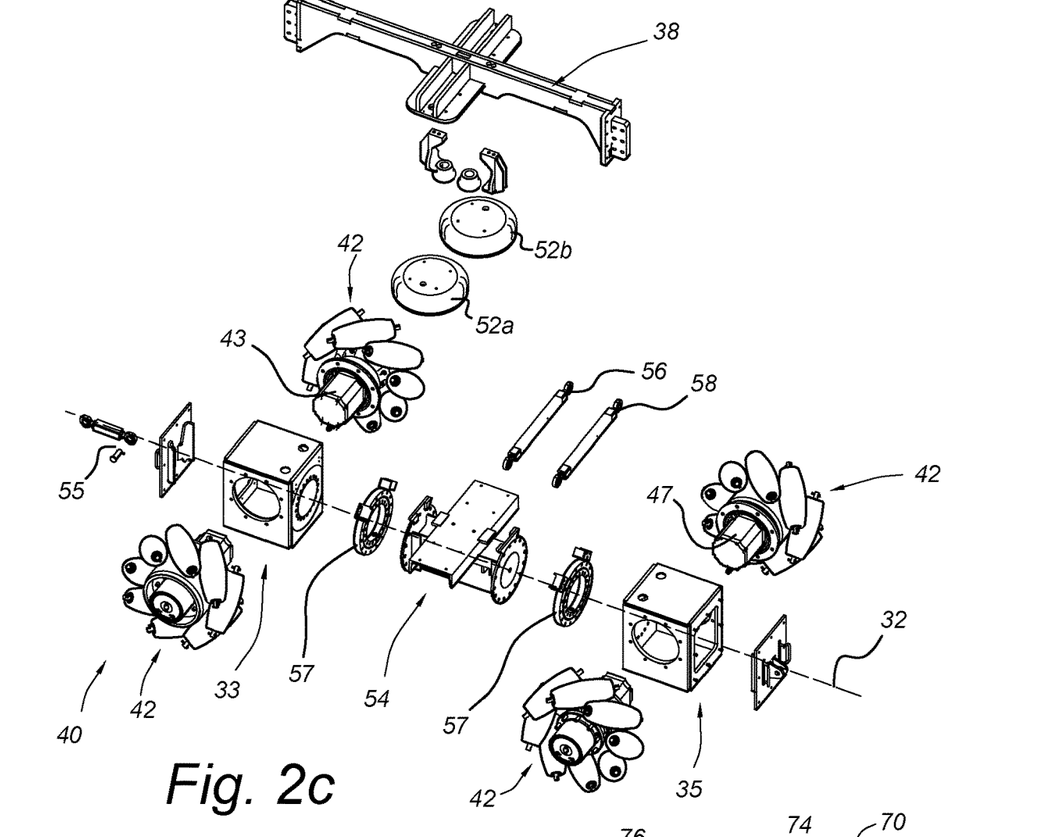

FIG. 2a shows a perspective view of an omnidirectional movement system 16, which will hereinafter be referred to as a bogie. FIG. 2b shows a side view of bogie 16, and FIG. 2c shows an exploded view of bogie 16.

Bogie 16 includes frame 30 extending along central axis 32 from first end 34 to second end 36, support 38, first wheel set 40 (with mecanum wheels 42, motor 43 with drive system, and first axle 44), second wheel set 46 (with mecanum wheels 42, motor 47 with drive system, and second axle 48), flexible suspension system 50 including airbags 52a, 52b, first control arm 55, second control arm 56 and third control arm 58.

Frame 30 includes first portion 33, second portion 35, central portion 54 and rotational bearings 57 connecting the portions. First portion 33 houses motor 43 and drive system (which can include an axle, gear train etc.) which drives first wheel set 40. First wheel set 40 extends through and connects to first portion 33 such that one Mecanum wheel sits on one side of frame 30 and central axis 32, and one Mecanum wheel 42 sits on the other side of frame 30 and central axis 32. First control arm 55 connects to an end of frame 30 first portion 33 with a rigid connection. Frame 30 second portion 35 houses motor 47 and drive system for second wheel set 46 which extends through second portion 35 and connects to second portion 35.

Each of first portion 33 and second portion 35 connect to central portion 54 through rotational bearings 57. The connection through rotational bearings 57 allows for rotational movements between portions 33, 35 and 54 of frame 30 around central axis 32. Second control arm 56 and third control arm 58 rigidly connect to and extend from a side of central portion 54.

Airbags 52a, 52b connect central portion 54 of frame 30 to support 38. In the embodiment of bogie 16 shown, airbag 52a is on a first side of central axis 32 and airbag 52b is on a second side of central axis 32. Other systems could include more or fewer airbags in different locations, or other systems which allow for flexible yet controllable suspension between support 38 and frame 30. Airbags 52a, 52b are connected to a pneumatic system (typically on base 14 of FIG. 1) such that they are able to be individually inflated or deflated to adjust the relative position between frame 30 and support 38, as well as the relative position between bogie 16 and base 14.

In use, bogie 16 is connected to robotic system 10 through support 38 and control arms 55, 56, 58. Support 38 is fixed to a base 14. Control arms 55, 56, 58 connect on one end of each arm 55, 56, 58 to frame 30 and connected on the other ends to base 14. Control arm connections transfer all movement forces from bogie 16 to base 14 to allow bogie 16 to move base 14 in any direction. The use of a single control arm 55 extending along the central axis 32 allows for a connection that is at least partially rotatable between the bogie 16 and base 14 in that direction and provides fore/aft stiffness between bogie 16 and base 14. Using two control arms 56, 58 extending but spaced apart from a side of frame transfers forces without allowing for rotation between first end 34 and second end 36 in a direction perpendicular to central axis 32, providing both side stiffness and moment stiffness for bogie 16 with respect to base 14.

Bogie 16 is a system which allows for omnidirectional movement while ensuring stable support for the base 14 of the system being moved by one or more bogies 16. Flexible suspension system 50 with airbags 52a, 52b; control arms 55, 56, 58; and rotational bearings 57 between frame 30 portions allow for steady support and driving despite an uneven floor or other obstacles. The flexible connections also allow for stable and level support on uneven or sloping ground. Using Mecanum wheel sets 44, 46 with separate drive systems and motors provides the power needed and the ability to move bogie 16 in any direction. Support 38 and control arms 55, 56, 58 provide a strong connection between bogie 16 and base 14 while allowing for relative and controlled movements.

Figure 3A:
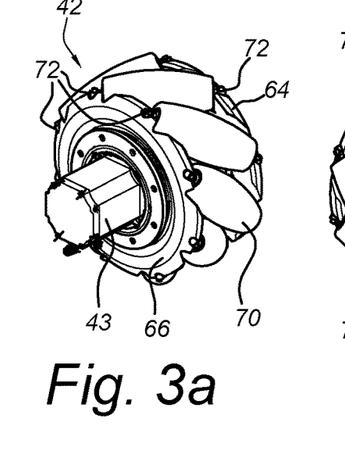
Figure 3B:
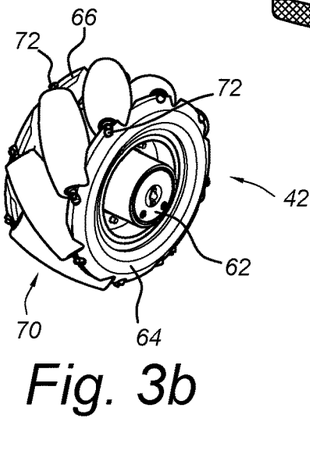
FIG. 3b shows a perspective view of the wheel of FIG. 3a from an other side.
Figure 3C:
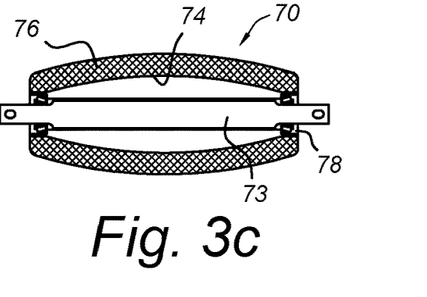

FIG. 3a shows a perspective view of a Mecanum wheel 42 from a first side, FIG. 3b shows Mecanum wheel 42 from the other side, and FIG. 3c shows a cross-sectional view of a roller 70.

Mecanum wheel 42 includes central hub 62, outer plate 64, inner plate 66, rollers 70 and fasteners 72. Motor 43 is also shown. Outer plate 64 and inner plate 66 connect to central hub which can be driven by motor and drive system (see FIGS. 2a-2b). These can each be lightweight aluminium or any other suitable material. Rollers 70 connect to each of outer plate 64 and inner plate 66 through fasteners 72 on each end. Fasteners can be bolts, or any other suitable fastener which allows for secure connections which can easily be removed. Motor 43 also drives the rotation of rollers 70, which allows for the omnidirectional movement of Mecanum wheels 42. The roller and hub profile can be a standard second order function that is typical of Mecanum wheel designs. Mecanum wheel 42 includes eight rollers 70, though other wheels can have more or fewer rollers.

Rollers 70 include central shaft 73, spindle 74, overmold 76 and roller bearings 78. Central shaft 73 extends through a center of roller 70 and connects to spindle 74 at roller bearings 78. Central shaft 73 can be corrosion protected steel or other materials which provide sufficient strength for roller 70. Spindle 74 is shaped to have a wider section in the middle with thinner ends where the connections to the shaft 72 are located. Overmold 76 is molded to spindle 74 to exend over spindle 74, and is a constant thickness along spindle 74. Overmold 76 can be rubber, polyurethane or another suitable material to support the expected payload. Example dimensions for roller 70 and overmold can be a roller length $R_L$ of 316 mm, and an overmold thickness $O_T$ of 25 mm.

Mecanum wheels 42 operate in a typical manner to past Mecanum wheels, allowing for omnidirectional movement through driving axle connecting wheels 42, as well as individual roller rotation 70. As rollers have to carry the substantial loads of system 10, they are susceptible to a lot of wear and tear through use and movement of robotic system 10. Rollers 70 are specially shaped and configured to provide for smooth motion over rough surfaces, reduce compressive stresses on the roller material, and increase the overall lifespan of the roller 70. Past rollers typically included material around the shaft which increased in thickness around the centre to form the desired roller profile and often only connect to the wheel at one point. By instead using a constant thickness for overmold 76 in roller 70 constant deflection over the length of the roller 70 is achieved, yielding smooth load transitions from one roller 70 to the next, and thereby decreasing wear in certain areas. The connection of rollers 70 on each end provides an increased load capacity, resulting in high load capacities for overall wheel 42. For example, the load capacity of Mecanum wheel 42 could be 3000 kg. The design and connections of roller 70 and wheel 42 leads to stronger rollers 70 and longer roller 70 lifespans, reducing the downtime needed for roller replacement on bogie(s) 16.

Figure 4A:
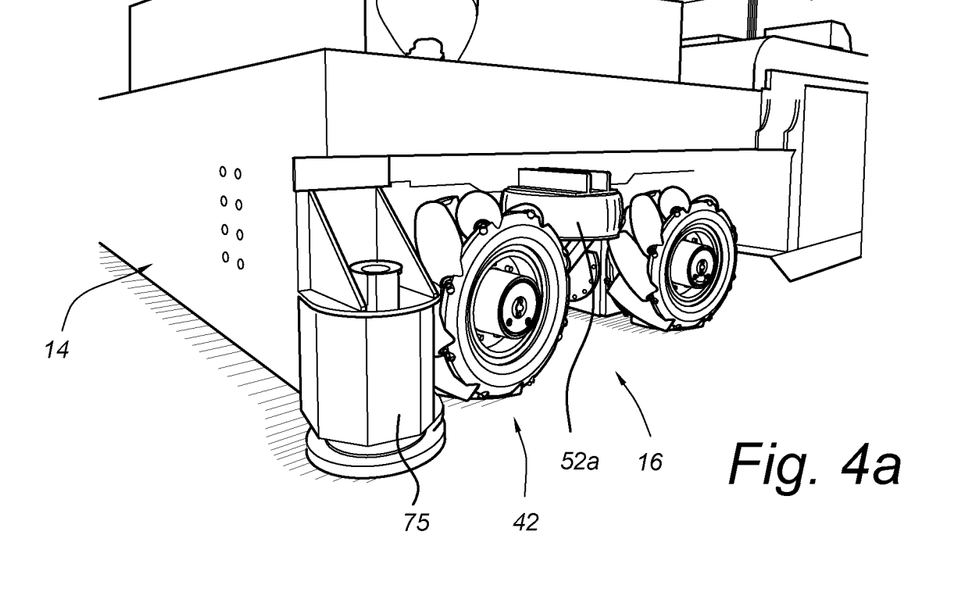
FIG. 4a shows a perspective view of a bogie and part of a base of the robotic system of FIG. 1.
Figure 4B:
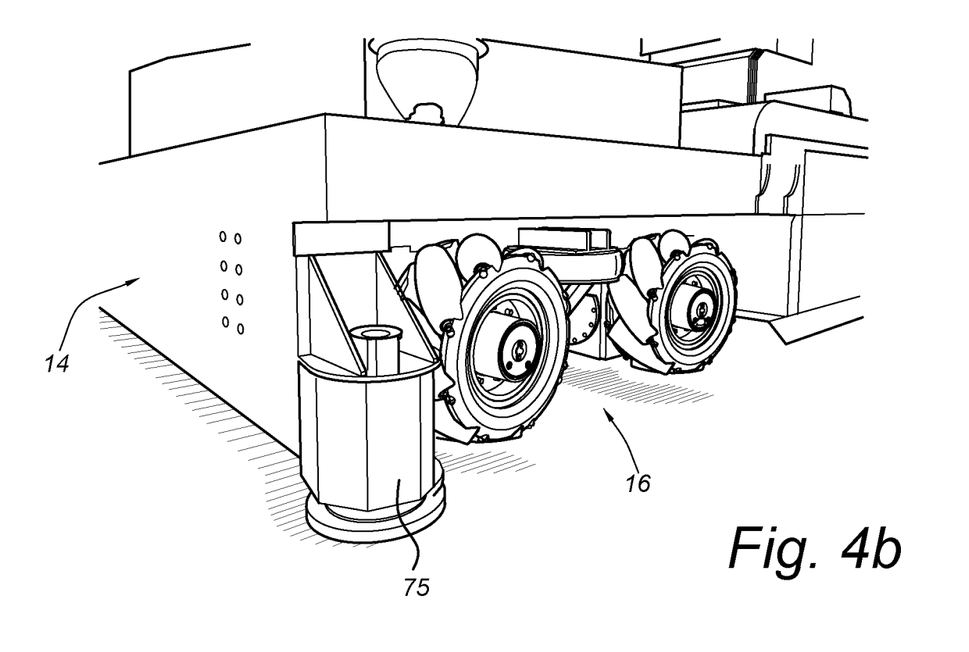
FIG. 4b shows a perspective view of FIG. 4a, with the base lowered for operations.

FIG. 4a shows a perspective view of a portion of system 10 of FIG. 1, in a drive mode. FIG. 4b shows a perspective view of FIG. 4a, with base 14 lowered with respect to bogie 16 for park mode. FIGS. 4a-4b show bogie 16 with Mecanum wheels 42, flexible suspension system with airbag 52a, and jack 75. Only one corner of base 14 is shown, and the other corners would typically be configured and operate similarly, with a bogie 16 and jack 75 at each corner.

For movement, bogie 16 works as described above, using Mecanum wheels 42 for movement in whichever direction desired. During such movements, airbags 52a, 52b of flexible suspension system 50 are inflated to a level where base 14 and jack 75 rest above the ground surface (e.g., 70 mm clearance), allowing for movement of system 10 on bogies 16. When system 10 is at a location to start operations park mode is entered. Airbags 52a, 52b are deflated such that jack 75 rests on the ground surface and most or all of system 10 weight is supported by jacks 75. This provides a stable base for operations. Control can be automatic or manual.

By using flexible suspension system 50 to allow for support of system 10 by jack 75, robotic system can be securely braced in park mode to avoid movements during operations and to be evenly supported despite any differences in ground elevation or abnormalities between corners of base 14. The flexible suspension system 50 allows for different levels of inflation between different corners of base 14 such that each jack can securely contact the ground and keep base 14 level. The stable support using jacks 75 allows for the precise movements of robotic system 10 in relation to the aircraft 12 despite the large size and movements of robotic system 10 components.

In summary, omnidirectional movement system 16 provides a flexible base system which can smoothly navigate rough surfaces, while allowing for movement in any direction in drive mode and stable support in park mode. The use of rotational bearings, control arm connections and a flexible suspension system give bogie 16 flexibility to traverse a variety of different surfaces while maintaining a stable base for robotic system 10 or another system using one or more bogies 16. The design and configuration of rollers 70 also provides for longer lasting Mecanum wheels 42. Flexible suspension system can also be used in combination with jack 75 or another stabilizing system (e.g., a jack directly connected to bogie 16) for allowing movement when desired and providing an even and stable base that does not move for operations.

In summary, omnidirectional movement system 16 provides a flexible base system which can smoothly navigate rough surfaces, while allowing for movement in any direction in drive mode and stable support in park mode. The use of rotational bearings, control arm connections and a flexible suspension system give bogie 16 flexibility to traverse a variety of different surfaces while maintaining a stable base for robotic system 10 or another system using one or more bogies 16. The design and configuration of rollers 70 also provides for longer lasting Mecanum wheels 42. Flexible suspension system can also be used in combination with jack 74 or another stabilizing system (e.g., a jack directly connected to bogie 16) for allowing movement when desired and providing an even and stable base that does not move for operations.

While the system has been shown and described using Mecanum wheels, other movement wheels or elements could be used in addition to or in place of the Mecanum wheels, for example, inflatable wheels and/or one or more track systems. Further some systems may not even have wheels or movement elements, and may be a system which remain in the same place and simply supports another system.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A robotic movement system comprising:
   a robotic base; and
   at least one omnidirectional bogie system, wherein each omnidirectional bogie system comprises:
      a frame;
      a first set of Mecanum wheels connected to the frame;
      a second set of Mecanum wheels connected to the frame;
      a flexible suspension system connecting the frame to the robotic base;
      wherein the flexible suspension system allows the bogie system to gimbal about a central axis with respect to the robotic base.

2. The robotic movement system of claim 1, wherein the flexible suspension system comprises:
   at least one airbag connecting between the frame and the robotic base; and
   at least one control arm to control front/aft, moment and/or side stiffness for the bogie system with respect to the robotic base.

3. The robotic movement system of claim 1, wherein the at least one omnidirectional bogie system comprises a plurality of omnidirectional bogie systems to which the robotic base is connected.

4. The robotic movement system of claim 1, further comprising one or more jacks connected to the robotic base and moveable with respect to the Mecanum wheels through the suspension system from a drive mode where the one or more jacks are located above a ground surface with the Mecanum wheels supporting the robotic base on the ground surface to a park mode where the one or more jacks are supporting the robotic base on the ground surface.

5. The robotic movement system of claim 1, wherein the frame comprises a central portion, a first portion, and a second portion, wherein the first set of Mecanum wheels is connected to the first portion and the second set of Mecanum wheels is connected to the second portion, wherein the first and second portions are rotatably connected to the central portion by rotational bearings so that the first and second portions can rotate relative to the central portion and relative to each other about the central axis.

6. The robotic movement system of claim 5, wherein the flexible suspension system comprises a pneumatic system allowing for vertical movement between the central portion of the frame and the robotic base.

7. The robotic movement system of claim 6, wherein the pneumatic system comprises at least one airbag supported by the central portion.

8. An omnidirectional movement system comprising:
   a frame with a central axis extending from a first end to a second end;
   a support extending from the first end to the second end;
   a first set of Mecanum wheels, wherein each of said wheels is connected through an associated first axle to the frame;
   a second set of Mecanum wheels, wherein each of said wheels is connected through an associated second axle to the frame;
   a flexible suspension system connecting the frame to the support, wherein the flexible suspension system comprises a pneumatic system which allows for movement in the roll and pitch axes, and for vertical movement between the frame and the support; and
   a stabilizing system for stabilizing the movement system when in a park mode, wherein the stabilizing system comprises one or more jacks that are moveable in relation to the Mecanum wheels through the flexible suspension system.

9. The omnidirectional movement system of 8, wherein the support is adapted for at least partially supporting thereon the robotic system, the omnidirectional movement system further comprising a first control arm connected to the frame along the central axis and connectable to the robotic system.

10. The omnidirectional movement system of claim 9, and further comprising:
    a second control arm connected to the frame in a direction perpendicular to the central axis and connectable to the robotic system to control position and stiffness for movement perpendicular to the central axis; and
    a third control arm connected to the frame in a direction perpendicular to the central axis and spaced from the second control arm, the third control arm connectable to the robotic system to control position and stiffness perpendicular to the central axis.

11. The omnidirectional movement system of claim 10, wherein the first control arm is connected to the frame such that it allows at least some rotation around the central axis, but is rigid in the direction of the central axis.

12. The omnidirectional movement system of claim 8, wherein the pneumatic system comprises at least one airbag.

13. The omnidirectional movement system of claim 8, wherein the pneumatic system comprises:
    a first airbag on a first side of the central axis connecting between the frame and the support; and a second airbag on a second side of the central axis connecting between the frame and the support.

14. The omnidirectional movement system of claim 8, wherein each Mecanum wheel comprises:
a central hub rotatable about an axis in line with the axle associated with said wheel;
an outer plate connected to the hub on a first side;
an inner plate connected to the hub on a second side; and
a plurality of rollers on the periphery of the hub connected between the outer plate and the inner plate.

15. The omnidirectional movement system of claim 14, wherein each roller comprises:
a central shaft;
a spindle surrounding the shaft and able to rotate with respect to the shaft;
an overmold material connected to an outside of the spindle; and
tapered roller bearings connecting the spindle to the central shaft.

16. The omnidirectional movement system of claim 15, wherein the overmold material is of constant thickness in every position on the spindle.

17. The omnidirectional system of claim 8, wherein the frame comprises a central portion, a first portion, and a second portion, wherein the first set of Mecanum wheels is connected to the first portion and the second set of Mecanum wheels is connected to the second portion, wherein the first and second portions are rotatably connected to the central portion by rotational bearings so that the first and second portions can rotate relative to the central portion and relative to each other about the central axis.

\* \* \* \* \*